US009155029B2

(12) United States Patent
Edge

(10) Patent No.: US 9,155,029 B2
(45) Date of Patent: Oct. 6, 2015

(54) METHOD AND APPARATUS FOR SCANNING FOR A WIRELESS ACCESS POINT

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/796,200

(22) Filed: Mar. 12, 2013

(65) Prior Publication Data
US 2014/0269491 A1 Sep. 18, 2014

(51) Int. Cl.
H04W 4/00 (2009.01)
H04W 48/16 (2009.01)
H04W 48/20 (2009.01)

(52) U.S. Cl.
CPC .............. *H04W 48/16* (2013.01); *H04W 48/20* (2013.01)

(58) Field of Classification Search
None
See application file for complete search history.

(56) References Cited

U.S. PATENT DOCUMENTS

| 7,515,575 | B1 | 4/2009 | Shi et al. |
| 8,254,985 | B2 | 8/2012 | Ekici et al. |
| 8,270,431 | B2 | 9/2012 | Brisebois et al. |
| 2003/0118015 | A1 | 6/2003 | Gunnarsson et al. |
| 2007/0183383 | A1* | 8/2007 | Bitran et al. ............... 370/338 |
| 2007/0184835 | A1* | 8/2007 | Bitran et al. ............... 455/434 |
| 2008/0176579 | A1 | 7/2008 | Abdel-Kader |
| 2008/0198820 | A1 | 8/2008 | Abdel-Kader |
| 2008/0222294 | A1* | 9/2008 | Liang ........................... 709/227 |
| 2009/0068970 | A1 | 3/2009 | Ahmed et al. |
| 2009/0131081 | A1 | 5/2009 | Abdel-Kader et al. |
| 2010/0103844 | A1 | 4/2010 | Kim |
| 2011/0110282 | A1* | 5/2011 | Wu et al. ..................... 370/311 |
| 2011/0222523 | A1 | 9/2011 | Fu et al. |
| 2012/0276899 | A1 | 11/2012 | Kolding et al. |

FOREIGN PATENT DOCUMENTS

| EP | 2320702 A1 | 5/2011 |
| WO | 02093955 A1 | 11/2002 |
| WO | 2009137718 A1 | 11/2009 |
| WO | 2013178111 A1 | 12/2013 |

OTHER PUBLICATIONS

Partial International Search Report—PCT/US2014/018613—ISA/EPO—Jun. 23, 2014, 7 pages.
International Search Report and Written Opinion—PCT/US2014/018613—ISA/EPO—Aug. 11, 2014, 25 pgs.
International Preliminary Report on Patentability—PCT/US2014/018613, European Patent Office—Munich, Germany, Jul. 22, 2015, 42 pgs.

* cited by examiner

*Primary Examiner* — Michael J Moore, Jr.
(74) *Attorney, Agent, or Firm* — Hunter Clark PLLC

(57) ABSTRACT

Techniques for access point acquisition using the location of a mobile device and probabilistic self-learning are described herein. An example of a method of scanning for an access point with a mobile device includes detecting a serving cell, determining a location for the mobile device, determining a maximum coverage area of an access point that is associated with the serving cell, determining whether the location of the mobile device is within the maximum coverage area, and performing a fast rate scan for the access point if the location is within the maximum coverage area.

18 Claims, 12 Drawing Sheets

METHOD AND APPARATUS FOR SCANNING FOR A WIRELESS ACCESS POINT

BACKGROUND

1. Field

This disclosure relates in general to wireless network systems and, more specifically, but not by way of limitation, to scanning for a suitable serving wireless access network with a mobile device.

2. Information

A mobile device can discover a wireless Access Point (AP) network station (e.g., access point, Femto cell, WiFi AP, Home Base Station) as part of periodic radio scanning for a suitable serving access network. Once an AP is discovered, it may be beneficial to the mobile device and the user to access the same AP at future times, provided the access is allowed, whenever the mobile device is again in the AP coverage area. For example, the mobile device may receive improved services (e.g. higher data throughput, better voice quality, lower signaling latency) when accessing a previously discovered AP and any associated network for the AP than when accessing some other network such as a public cellular network that provides wireless coverage in the same area. Furthermore, the user may be billed by the operator for the AP at a lower rate than by some other network operator with wireless coverage in the same area. In some cases, a user may even receive free wireless access from the operator of an AP (e.g. with the free access being an inducement or compensation to the user for entering and remaining within some specific area such as an airport, restaurant or shopping mall). In certain other cases, the operator of a cellular network may benefit in the form of reduced network loading and congestion by having a mobile device acquire certain APs whenever possible and thereby no longer need to directly access the operator's cellular network. However, re-acquiring an AP at a later time by the mobile device may be difficult and resource intensive. For example, the mobile device could perform a fast periodic scan when in the general vicinity of the AP, but this may consume battery power while the mobile device is outside the actual AP coverage area and may further interfere with support of other services for the user when accessing another wireless network since the mobile device may need to tune away from the current wireless network in order to perform a scan. The mobile device may conserve power and reduce the interference to other services by performing a scan at a lower rate, but this may delay re-acquisition once the mobile device enters the AP coverage area.

There is thus a need to improve the efficiency of AP acquisition and re-acquisition without substantially increasing latency. Currently, there are many ways to estimate a position of a mobile device on a network. For example, Global Navigation Satellite System (GNSS) chips on a mobile device can provide position estimates when the mobile device is located in outdoor and open space environments. In another example, Wide Area Networks (WAN) base stations and Access Point (AP) networks (e.g., using WiFi, CDMA, WCDMA, LTE or Bluetooth) can be used to estimate the position of a mobile device. Such position information can be used in combination with prior scan detection data to provide improved power conservation while scanning for an AP.

SUMMARY

An example of a method of scanning for an access point with a mobile device according to the disclosure includes detecting a serving cell, determining a location for the mobile device, determining a maximum coverage area of an access point that is associated with the serving cell, determining whether the location of the mobile device is within the maximum coverage area, and performing a fast rate scan for the access point if the location is within the maximum coverage area.

An example of a method of scanning for an access point with a mobile device includes determining a plurality of locations associated with an access point, determining a detection probability of the access point for each location, determining that the mobile device is at one location of the plurality of locations, and performing a scan for the access point wherein the rate of the scan is based on the detection probability for the one location.

An example of a method of scanning for an access point with a mobile device according to the disclosure includes identifying a serving cell, determining a location of the mobile device, determining a maximum coverage area of an access point that is associated with the serving cell and location of the mobile device, and scanning for the access point at a fast rate if the location of the mobile device is within the maximum coverage.

An example of a method for providing access point detection probabilities to a mobile device according to the disclosure includes storing one or more detection probabilities that are associated with one or more access points, receiving location information from the mobile device, retrieving one or more detection probability based on the location information, and providing the one or more detection probability to the mobile device.

An example of an apparatus for scanning for an access point according to the disclosure includes means for detecting a serving cell, means for determining a location for a mobile device, means for determining a maximum coverage area of an access point that is associated with the serving cell, means for determining whether the location of the mobile device is within the maximum coverage area, and means for performing a fast rate scan for the access point if the location is within the maximum coverage area.

An example of an apparatus for scanning for an access point according to the disclosure includes means for determining a plurality of locations associated with an access point, means for determining a detection probability of the access point for each location, means for determining that a mobile device is at one location of the plurality of locations, and means for performing a scan for the access point wherein the rate of the scan is based on the detection probability for the one location.

An example of an apparatus for providing access point detection probabilities to a mobile device according to the disclosure include means for storing one or more detection probabilities that are associated with one or more access points, means for receiving location information from the mobile device, means for retrieving one or more detection probability based on the location information, and means for providing the one or more detection probability to the mobile device.

An example of an apparatus for scanning for an access point according to the disclosure includes a memory, at least one processor coupled to the memory and configured to detect a serving cell, determine a location for a mobile device, determine a maximum coverage area of an access point that is associated with the serving cell, determine whether the location of the mobile device is within the maximum coverage area, and perform a fast rate scan for the access point if the location is within the maximum coverage area.

An example of an apparatus for scanning for an access point according to the disclosure includes a memory, at least one processor coupled to the memory and configured to determine a plurality of locations associated with an access point, determine a detection probability of the access point for each location, determine that a mobile device is at one location of the plurality of locations, and perform a scan for the access point wherein the rate of the scan is based on the detection probability for the one location.

An example of an apparatus according to the disclosure includes a memory, at least one processor coupled to the memory and configured to identify a serving cell, determine a location of a mobile device, determine a maximum coverage area of an access point that is associated with the serving cell and location of the mobile device, and scan for the access point at a fast rate if the location of the mobile device is within the maximum coverage.

An example of an apparatus for providing access point detection probabilities to a mobile device according to the disclosure includes a memory unit configured to store one or more detection probabilities that are associated with one or more access points, and at least one processor configured to receive location information from the mobile device, retrieve from the memory unit one or more detection probability based on the location information, and provide the one or more detection probability to the mobile device.

An example of a computer program product residing on a processor-executable computer storage medium according to the disclosure processor-executable instructions configured to cause a processor to detect a serving cell, determine a location for a mobile device, determine a maximum coverage area of an access point that is associated with the serving cell, determine whether the location of the mobile device is within the maximum coverage area, and perform a fast rate scan for the access point if the location is within the maximum coverage area.

An example of a computer program product residing on a processor-executable computer storage medium according to the disclosure includes processor-executable instructions configured to cause a processor to determine a plurality of locations associated with an access point, determine a detection probability of the access point for each location, determine that a mobile device is at one location of the plurality of locations, and perform a scan for the access point wherein the rate of the scan is based on the detection probability for the one location.

An example of a computer program product residing on a processor-executable storage medium according to the disclosure includes processor-executable instructions configured to cause a processor to store one or more detection probabilities that are associated with one or more access points, receive location information from the mobile device, retrieve from the memory unit one or more detection probability based on the location information, and provide the one or more detection probability to the mobile device.

Items and/or techniques described herein may provide one or more of the following capabilities, as well as other capabilities no mentioned. The current serving cell and location of a mobile device may be recorded when an access point is detected. A maximum coverage area for an access point can be calculated. One or more detection probabilities for an access point can be associated with a serving cell and a geographic area. Determining the detection probabilities for an access point can be crowd sourced. Detection probabilities may be provided to a mobile device. The access point scan rate used by a mobile device may depend on a detection probability. Battery power may be conserved and connection performance may be improved by using an appropriate scan rate. The techniques described herein can be implemented on both a network based server or within a handset using downloaded or discovered cellular data. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWING

The features, objects, and advantages of embodiments of the disclosure will become more apparent from the detailed description set forth below when taken in conjunction with the drawings, in which like elements bear like reference numerals. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
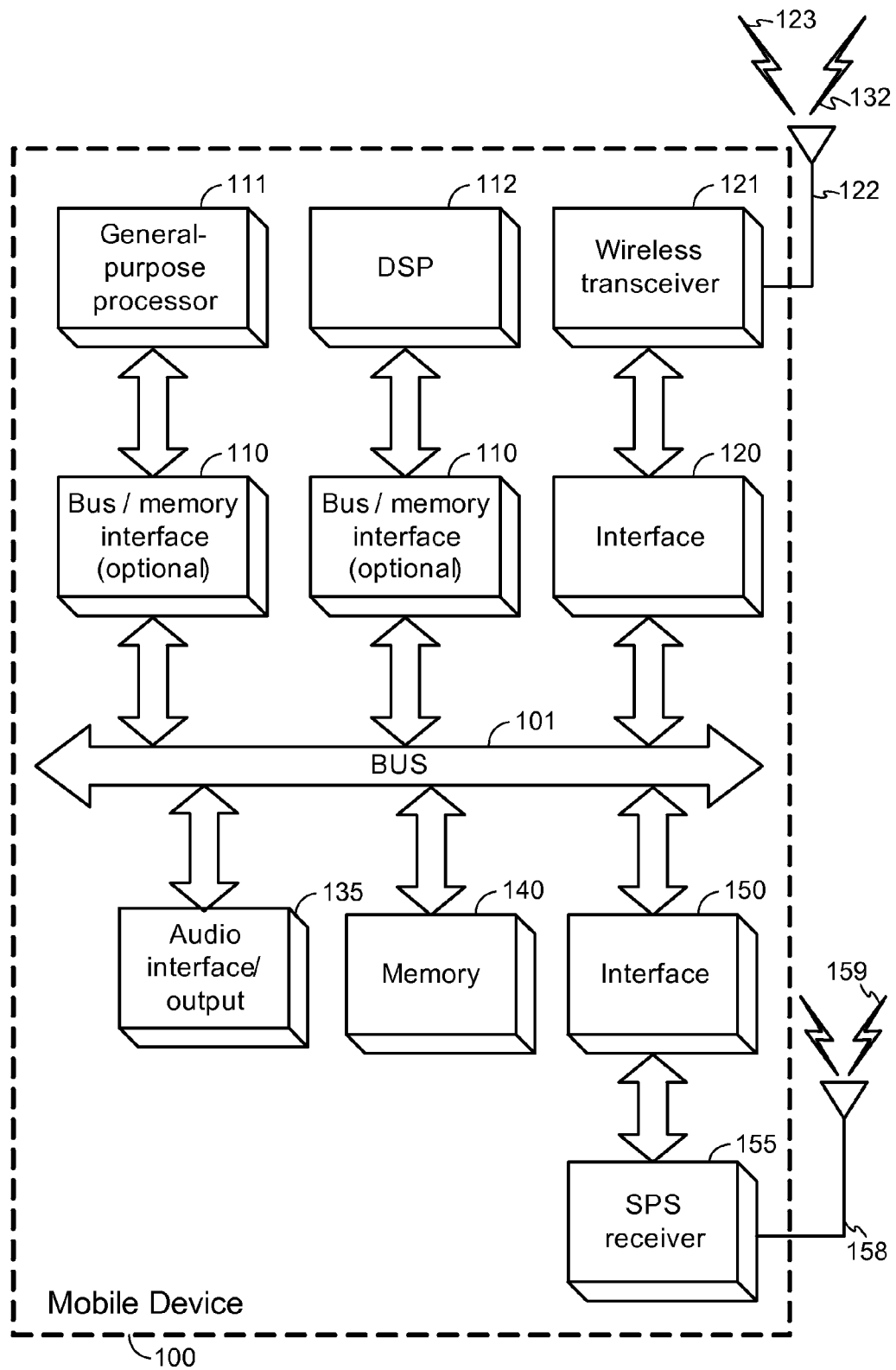
FIG. 1 is a schematic block diagram illustrating an exemplary mobile device capable of receiving WAN base station, access point and positioning signals, in accordance with an implementation.

A method and system are disclosed that allow for AP acquisition using location and probabilistic self-leaning. An AP (e.g., access point, a Femto cell, WiFi AP, Home Base Station, Home Node B, Home eNodeB) provides a mobile device with the ability to access a network such as a wireless cellular network, a wireline broadband network or the Internet. Typically, a mobile device will be able to access other networks and other devices and entities from the network initially accessed via the AP or directly via just the AP. In some cases, an AP may provide direct access to a plurality of networks and not one particular network. In the following description, an AP is considered to typically have a small coverage area (e.g. a circular area with a radius of 100 meters or less) and to correspond to a WiFi AP, Femto cell or Home Base Station. This limitation typically contrasts with the base stations in a cellular network which may typically support wireless cells with a span or range of a few hundred meters up to several kilometers. Due to this difference, a mobile device may typically receive service from a cellular network and have a serving base station and a serving cell at any time while accessing the cellular network. A mobile device may then record the ID of its current serving cell when accessing a cellular network each time it scans for and acquires a particular AP. The mobile device may also record other visible cell IDs associated with its current or previous serving cellular network or associated with some other cellular network for the duration of its access to a particular AP. A mobile device may also periodically record its location for the duration of AP access. For example, as a mobile device travels it may receive location information by detecting and/or measuring terrestrial radio signals from various WAN base stations and/or APs (e.g., serving cells, WAN access points, Femto cell, WiFi AP). A mobile device may also receive and/or measure location related signals from Satellite Positioning Systems (SPS). The received and/or measured terrestrial and/or SPS signals may be used to determine a location of the mobile device. Base station and AP almanacs may store various location and related information used to determine the position of a mobile device. MAC addresses, or other identifying information (e.g., SSIDs, Index Numbers) of base stations and APs can correspond to almanac entries. The mobile device may obtain base station and AP almanacs and/or SPS related information from a serving network, home network or some server (e.g. a location server) resident in or reachable from such a network at the current time or at some previous time in order to obtain its location from received and/or measured terrestrial and/or SPS signals. Alternatively, a network or network entity (e.g. a location server) may determine the location of the mobile device using base station almanacs and/or SPS related information if the mobile device provides the network or network entity with information on the received and/or measured terrestrial and/or SPS signals. The network or network entity may then provide the determined location to the mobile device.

In an embodiment, the data acquired by a mobile device (e.g. the serving cells, other visible cell IDs and locations observed by a mobile device while accessing a particular AP) may be crowd sourced to a location server where it may be combined with similar data from other mobile devices. The data associating the cell IDs (e.g., serving and visible) and locations with a particular AP may be aggregated by the location server to form a more complete set of cells and locations (or a location area) associated with the AP. In an example, the aggregated information may be provided to a mobile device. Examples of the scan history data stored on the server may include tables indexed by an ID variable for an AP, an ID of associated serving or visible cells, location points reported by a terminal while utilizing the AP, and probabilities that an AP will be detected based on the ID(s) of the serving and visible cells.

Referring to FIG. 1, a mobile device 100 may contain a wireless transceiver 121 which is capable of sending and receiving wireless signals 123, 132 via a wireless antenna 122 over a wireless network and connected to a bus 101 by a wireless transceiver bus interface 120. The wireless transceiver bus interface 120 may, in some embodiments be a part of the wireless transceiver 121. Some embodiments may have multiple wireless transceivers 121 and wireless antennas 122 to support multiple wireless standards such as WiFi, CDMA, WCDMA, LTE and Bluetooth.

In certain embodiments, mobile device 100 may contain a Satellite Positioning System (SPS) receiver 155 capable of receiving Satellite Positioning System (SPS) signals 159 via SPS antenna 158. SPS receiver 155 may also process, in whole or in part, the Satellite Positioning System (SPS) signals 159 and use the SPS signals 159 to determine the location of the mobile device. In some embodiments, general-purpose processor(s) 111, memory 140, DSP(s) 112 and specialized processors (not shown) may also be utilized to process the SPS signals 159, in whole or in part, and/or calculate the location of the mobile device 100, in conjunction with SPS receiver 155. The storage of SPS or other location signals may be done in memory 140 or registers. An audio interface/output 135 can be included in mobile device 100 to convert signals to audible sound to enable transmission of the audible sound to the user.

The mobile device 100 may contain DSP(s) 112 connected to the bus 101 by a bus interface 110, general-purpose processor(s) 111 connected to the bus 101 by a bus interface 110 and memory 140, also sometimes connected to the bus by a bus interface 110. The bus interfaces 110 may be integrated with the DSP(s) 112, general-purpose processor(s) 111 and memory 140 with which they are associated. In various embodiments, functions may be stored as one or more instructions or code in memory 140 such as on a computer-readable storage medium, such as RAM, ROM, FLASH, or disc drive, and executed by general-purpose processor(s) 111, specialized processors, or DSP(s) 112. Memory 140 is a processor-readable memory and/or a computer-readable memory that stores software code (programming code, instructions, etc.) configured to cause the processor(s) 111 and/or DSP(s) 112 to perform functions described.

In other embodiments, functions may be performed in hardware. Mobile device 100 may correspond to a cell phone, smart phone, PDA, tablet, laptop, personal computer, tracking device or other moveable entity with a wireless interface and may be referred to as a wireless device, a wireless terminal, a terminal, a user equipment (UE), mobile station (MS), station, mobile terminal or by some other name.

Figure 2:
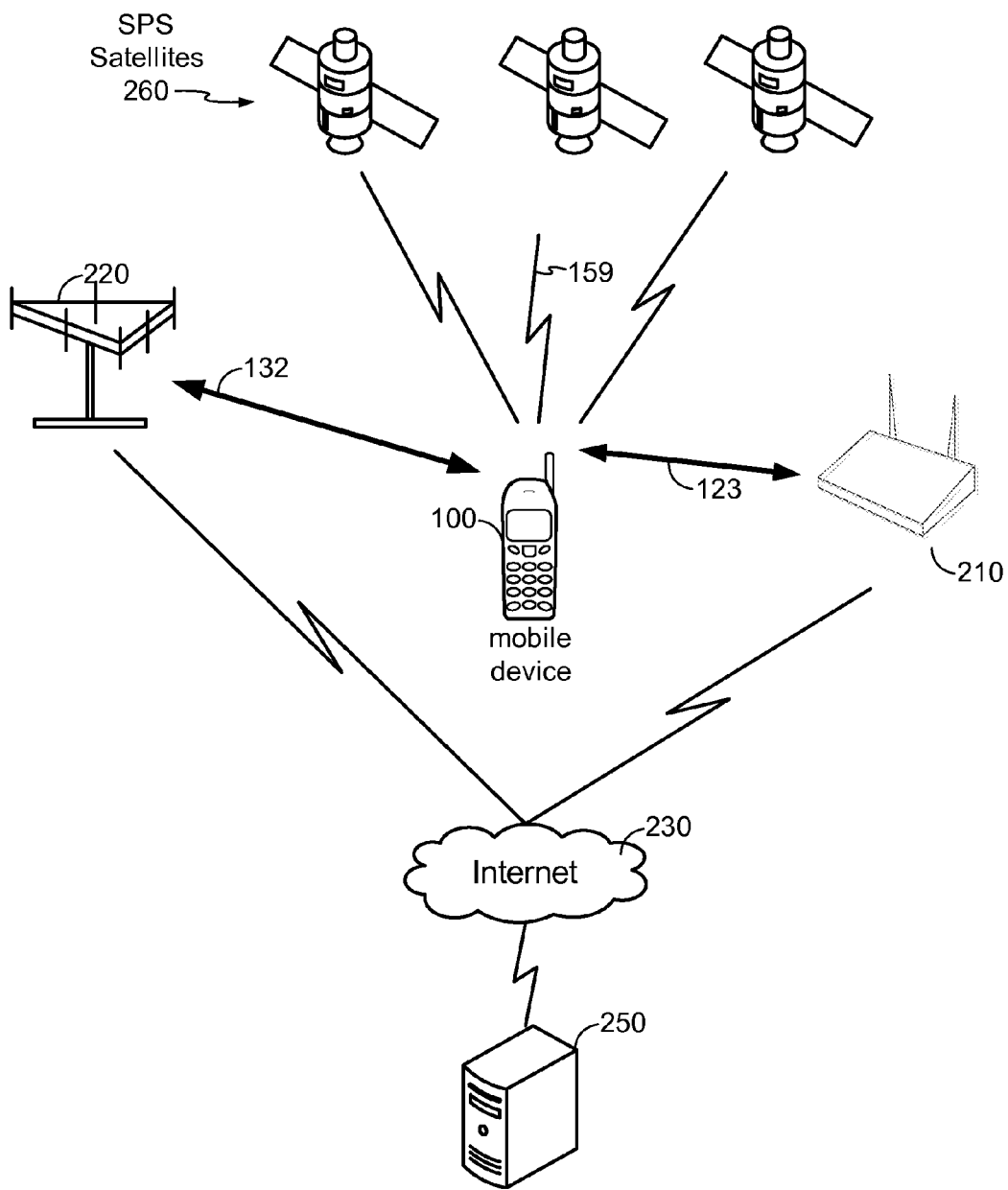
FIG. 2 is a system diagram illustrating certain features of a system containing a mobile device capable of receiving WAN base station, access point, and positioning signals, in accordance with an implementation.

Referring to FIG. 2, a mobile device 100 may receive SPS signals 159 from SPS Satellites 260. In some embodiments, the SPS Satellites may be from one global navigation satellite system (GNSS), such as the GPS, Galileo or Glonass satellite systems. In other embodiments, the SPS Satellites may be from multiple GNSS such as, but not limited to, GPS, Galileo, Glonass, or Beidou (Compass) satellite systems. The receiving and processing of SPS signals 159 is optional and not a limitation. In an embodiment, mobile devices without SPS capabilities may be used.

The mobile device 100 may query a location server 250 via an AP 210 (i.e., via wireless link 123), or via a serving cell base station 220 (i.e., via cellular link 132), which may be connected via a network 230 such as the Internet or a cellular wireless network. The configuration of the location server 250 is exemplary only, and not a limitation. In an embodiment, the location server may be connected directly to the serving cell base station 220. More than one location server may be used. The location server 250 may include one or more databases containing location information associated with base stations and/or APs on a network. The location information may be associated with one or more APs 210, and/or one or more serving cell base stations 220. In an example, the location server 250 is comprised of multiple server units such as a base station almanac, an access point almanac, and a scan history database. The location server may further include one or more databases containing location and time related information for one or more GNSS systems that may enable determination of the location of mobile device 100 using measurements of SPS signals by mobile device 100. The location server may correspond to a Secure User Plane Location (SUPL) Location Platform (SLP) defined in public documents from the Open Mobile Alliance (OMA). The location server may also or instead correspond to a location server defined by, or enabled to support location related protocols and procedures defined by, other organizations such as the $3^{rd}$ Generation Partnership Project (3GPP), $3^{rd}$ Generation Partnership Project 2 (3GPP) or the Internet Engineering Task Force (IETF). Mobile device 100 and location server 250 may jointly implement one or more location solutions such as OMA SUPL or a control plane location solution defined by 3GPP or 3GPP2 in order to determine the location of mobile device 100 at any time. Either mobile device 100 or location server 250 may determine the location of mobile device 100 and in case of location determination by location server 250, the location may be transferred to mobile device 100 by location server 250 either directly or indirectly. In some embodiments, mobile device 100 may determine its location or a change to its location based at least in part on measurements from inertial sensors attached to or within mobile device 100 (e.g. accelerometers, barometers, gyroscopes, magnetometers).

Figure 3:
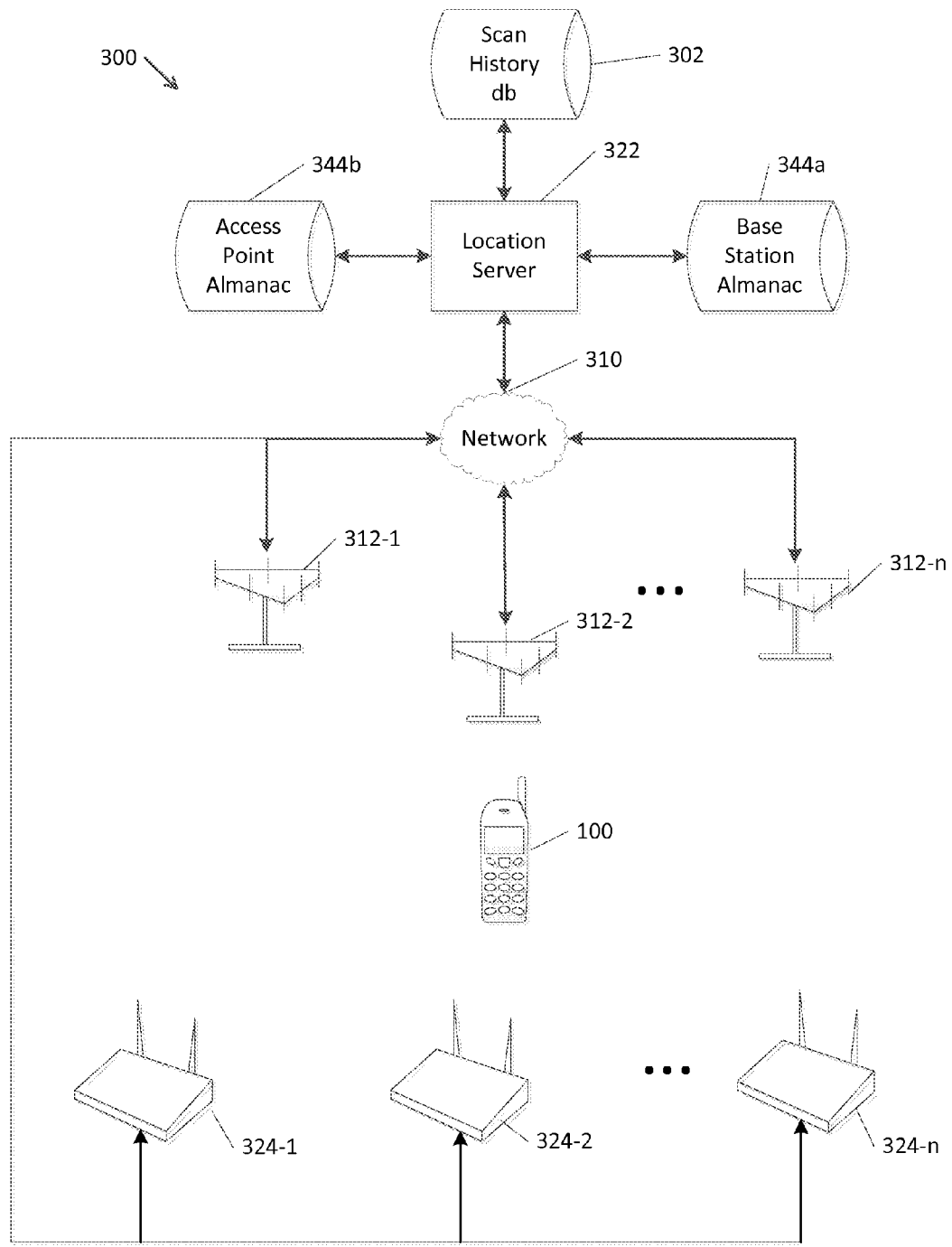
FIG. 3 is a block diagram of an embodiment of a system for AP acquisition using location and probabilistic self-learning.

Referring FIG. 3, a block diagram of an embodiment of a system 300 for AP acquisition using location and probabilistic self-learning is shown. The system 300 allows a wireless mobile device 100 to communicate with a base station 312 (e.g., 312-1, 312-2, 312-n), and scan for APs 324 (e.g., 324-1, 324-2, 324-n). A base station 312 can support one or more serving cells, but for ease of explanation, the terms base station and serving cell will be used synonymously throughout this specification. An AP may be generally referred to as an access point or an AP network station. In an embodiment, the mobile device 100 can communicate with a base station 312 to provide and/or receive location information. The base stations 312 and the APs 324 can be coupled to a location server 322 via a network 310. In an embodiment, the network 310 can include the Internet and/or additional networks (not shown in FIG. 3). The location server 322 can access a base station almanac 344a, an access point almanac 344b, and a scan history database 302 to analyze and process location and scan information. For example, the location server 322 can determine and output position estimates based on the location information stored in the almanacs 344a, 344b. The location server 322 can utilize the scan history database 302 to provide the mobile device 100 with information pertaining to nearby access points. The data in the base station almanac 344a, the access point almanac 344b, and scan history database 302 can persist in a single database, or in separate databases as shown in FIG. 3. The location server 322, the base station almanac 344a, the access point almanac 344b, and scan history database 302 can be part of the location server 250 shown in FIG. 2. The location server 322 may additionally access other data that may be used to locate mobile device 100 or assist mobile device 100 to locate itself such as information for one or more GNSS systems (e.g. satellite orbital and timing data, atmospheric delay data) which is not shown in FIG. 3.

In an embodiment, the mobile device 100 is a cellular phone that may have any number of communication modes (e.g., GSM, CDMA, digital AM or FM radio, digital TV, TDMA, WCDMA, OFDM, GPRS, EV-DO, WiFi, Bluetooth, WiMAX, UWB, LTE, satellite phone or data, etc.) to transfer voice and/or data with cellular, satellite and/or mesh networks by way of the base stations 312, and APs 324. In general, base stations 312 and APs 324 can allow some sort of data or voice transport. The identifier in the case of a WAN network station 312 can be a Station ID (SID), a Network ID (NID), a Base Station ID (BSID), a cell ID and/or latitude and longitude information. The identifier in the case of an AP 324 can be a Service Set ID (SSID) and/or a MAC address.

In an embodiment, the base stations 312 represent cellular serving cells with a range of approximately 100 meters up to 20 kilometers, and the AP 324 represent Femto cells or WiFi APs with a range of approximately 10 up to 150 meters with the exact range in either case depending on the transmission power, the antenna height and gain, the radio technology, the terrain and local environment and possibly other factors. When the mobile device 100 moves across the system 300, it is generally in communication with one of the base stations 312 for a longer time period as compared to an AP access point 324 because of the difference in range. At any given point within the system 300, the mobile device 100 may record its current location and the ID associated with a base station 312 (e.g., the current serving cell ID) whenever the mobile device 100 acquires a particular AP 324. The mobile device 100 may also record other visible base station and AP IDs for the duration of a connection with a particular AP. A mobile device 100 may also periodically record its location for the duration of a connection with an AP.

In general, the position information associated with AP 324 can be stored within the access point almanac 344b. For example, each AP 324 may possess a SSID and/or MAC address as identifier information. Other characteristics of the base stations 312 and AP 324 could be used in uniquely identifying the base stations 312 and AP 324. For example, if two base stations had the same station identifier, but only one supported a particular communication standard, the two could be uniquely identified. FIG. 3 shows that the location server 322 is separate from the network stations 312, 324, but in other embodiments, each cooperative station 312, 324 could have a location server 322. The location server 322 could be implemented with a computer or network of computers either in a single location or distributed across a number of locations. The base station and access point almanacs 344a, 344b and the scan history database 302 could be centrally located, but in other embodiments they can be distributed regionally or in portions relevant to each base station 312 and AP 324. In an embodiment, portions of the base station and access point almanacs 344a, 344b and the scan history database 302 may be stored in mobile device 100—e.g. if transferred from location server 322 or if assembled directly by mobile device 100. In an example, a first base station 312-1, may store a portion of the base station almanac 344a for its footprint and all adjacent base station footprints. The footprint can be based on the Maximum Antenna Range (MAR) of a base station, or other geographic constraints which may impact the operational performance of the base station.

Figure 4A:
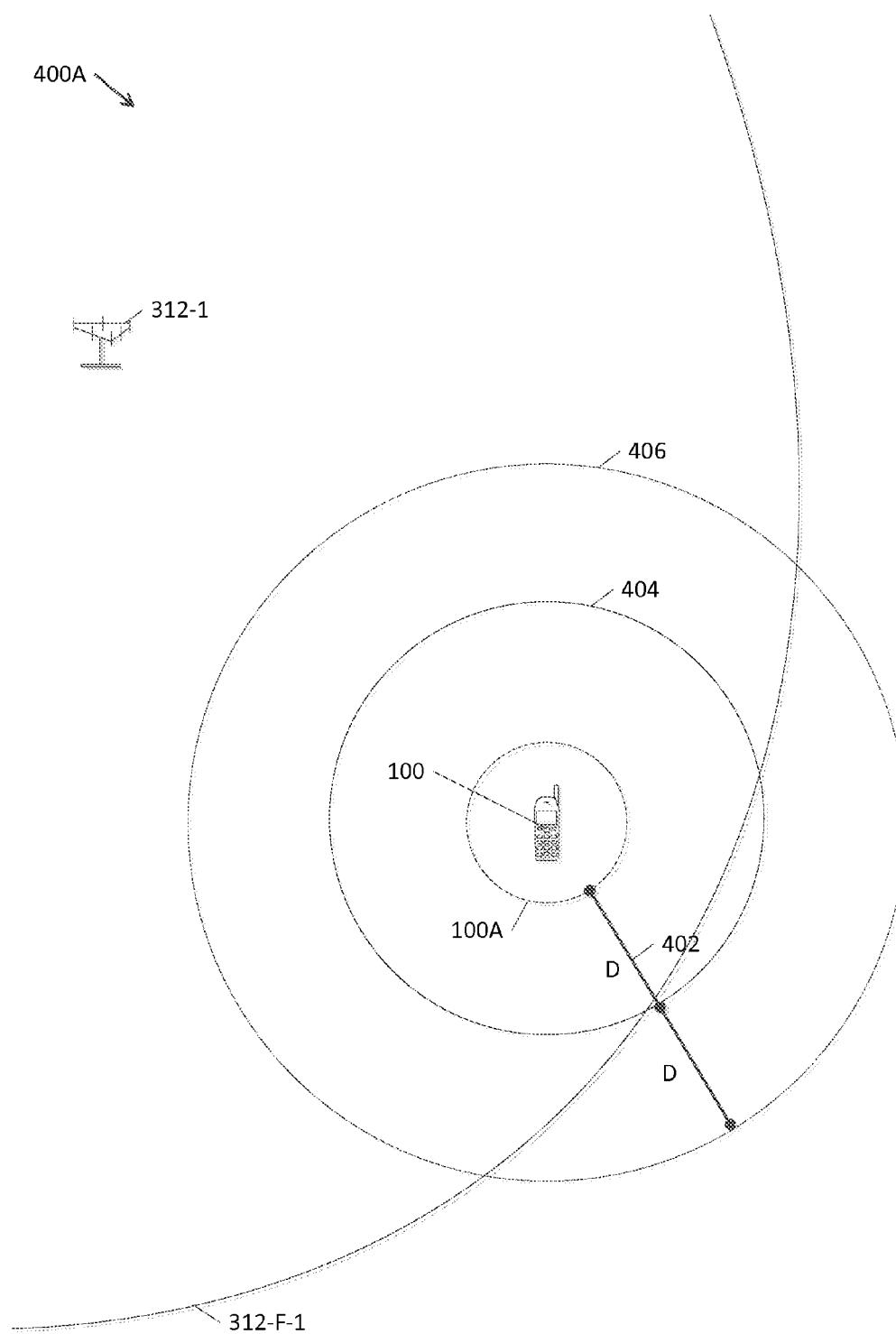
FIG. 4A is a spatial diagram of a maximum coverage area that is associated with an AP upon detection by a mobile device.

Referring to FIG. 4A, with further reference to FIG. 3, a spatial diagram 400A of a maximum coverage area 406 that is associated with an AP upon detection by a mobile device 100 is shown. The diagram 400 includes the serving cell 312-1 and a single AP (not shown). The ranges in FIG. 4A are not to scale and have been generalized to help demonstrate the process. The location of the mobile device 100 is determined with some degree of uncertainty which is depicted as the geographic uncertainty region 100A which may be a circle (as in FIG. 3) or some other shape such as an ellipse or polygon, and within which mobile device is located with some known or assumed probability (e.g. a probability of 95%). When the mobile device 100 detects the AP for the first time, the location of the mobile device 100 and an ID for the current serving cell 312-1 can be recorded. For example, the location server 322 can create a record in the scan history database 302 either immediately if mobile device 100 transfers the information immediately when the AP is detected or at a later time if the transfer occurs later. Since the mobile device 100 can detect the AP, it can be assumed that the mobile device is within the coverage area of the AP. Using a WiFi station as an exemplary AP, a typical coverage area is a circle of radius 'D' from the WiFi station. The length of D can be determined based on factors such as transmission power, type of radio technology, and antenna configuration. The AP can transmit these factors, or other information which is associated with the value of D, to the mobile device. In an example, the length of D can be 50 m when the access point operates with WiFi radio technology. The location of the AP can be assumed to be within a circular location area 404 which has a radius of D 402 plus the radius of the uncertainty area 100A. With the AP located within the location area 404, the maximum coverage area 406 of the AP station is determined to be the area of a concentric circle with a radius of 2*D plus the radius of the uncertainty area 100A. The location information which describes the maximum coverage area 406 can include the measured location of the mobile device (e.g., the lat/long for the center of the uncertainty region 100A) and the radius of the maximum coverage area 406 (e.g., 2*D plus the radius of 100A). This maximum coverage area information together with the ID of the AP station can be stored in the base station and/or access point almanacs 344a, 344b, and indexed with an ID for the serving cell 312-1.

Figure 4B:
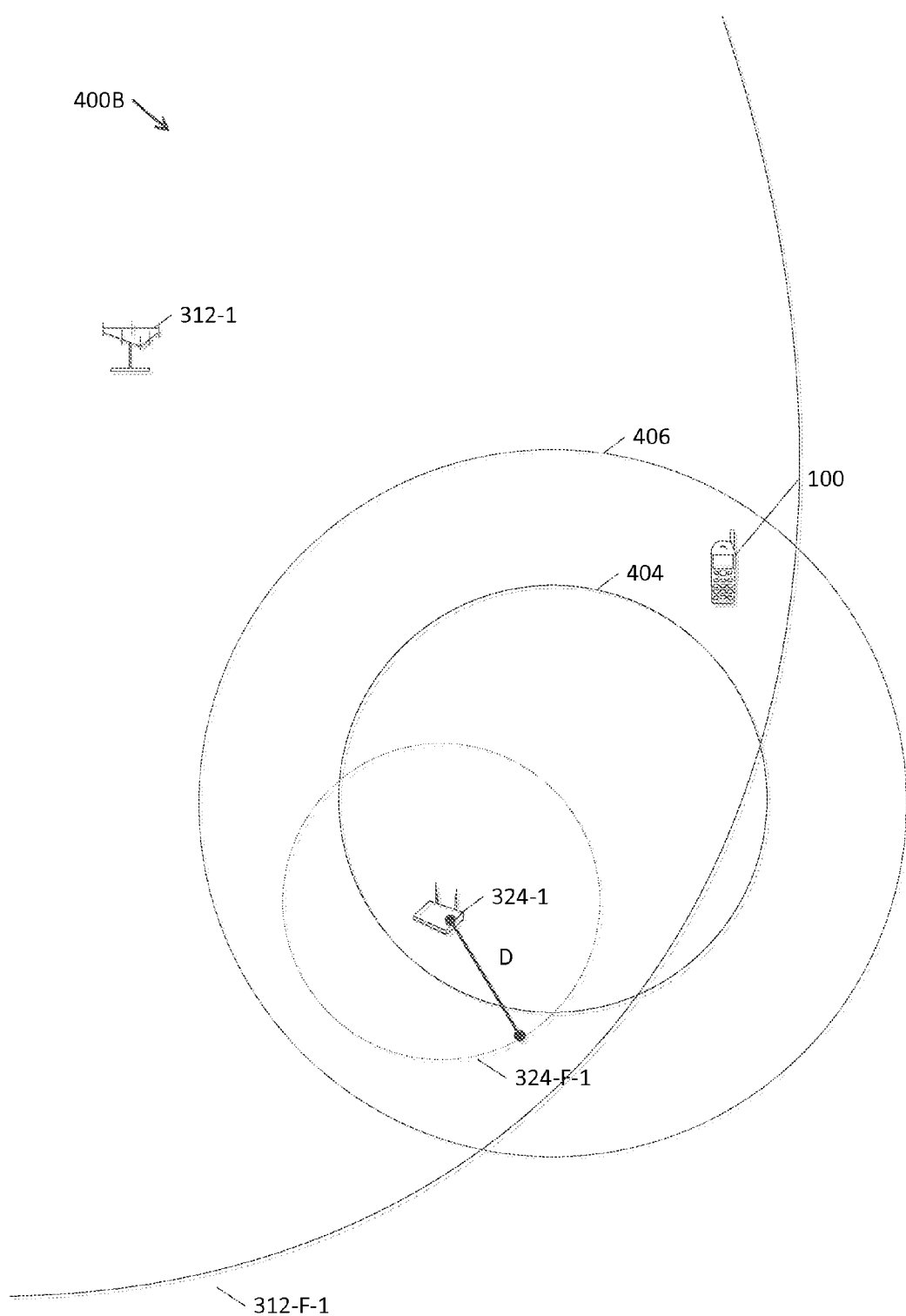
FIG. 4B is a spatial diagram of the relationship between the maximum coverage area that is associated with an AP and the location of the AP.

Referring to FIG. 4B with further reference to FIG. 4A, the spatial diagram 400B shows the relationship between the maximum coverage area 406 that is associated with an AP 324-1 and the location of the AP. During a subsequent time, the mobile device 100 (or any other mobile device) can attempt to scan for an AP station. The mobile device 100 can record an ID of the serving cell 312-1 and its current location (including an uncertainty area which is not shown if FIG. 4B). The location server 322 or the mobile device 100 can query the almanacs 344 and scan history database 302 to determine if the mobile device is within the maximum coverage area of an AP—e.g. based on the mobile device 100 being in a serving cell associated with detection of the AP. In this case, as depicted in FIG. 4B, the mobile device 100 is within the previously stored maximum coverage area 406. More precisely, at least a portion of the uncertainty area (and, depending on the example, maybe the entire uncertainty area) for the mobile device 100 is within the maximum coverage area 406. Since the mobile device 100 is or may be within the maximum coverage area 406, there is a higher probability that it will make a connection with the AP 324-1. The mobile device 100 can be configured to perform a scan at a higher rate and/or for a longer period of time based on the higher probability of making a connection. In an embodiment, a high rate of scan means the mobile device 100 will scan for an AP every 3 minutes versus scanning every 10 minutes for a normal rate of scan.

In the example depicted in FIG. 4B, the higher rate of scan and/or longer scan will not lead to a connection with the AP 324-1 because the mobile device 100 is out of range. The AP 324-1 is located within the location area 404, but it is too far from the mobile device. The actual range of the AP 324-1 is the length 'D' and is depicted by the concentric circle labeled 324-F-1, which is not large enough to communicate with the mobile device 100. In this case, the mobile device 100 can complete the scan and provide a notification of an unsuccessful result to the location server 322 or store the notification for later transfer to location server 322. The location server 322 can log the unsuccessful scan result in the scan history database 302. In an embodiment, the location server 322 can concurrently log the time and location of the mobile device 100 of the unsuccessful scan event. Other system parameters may also be logged after an unsuccessful scan. After an unsuccessful scan for an AP, the mobile device 100 can be configured to perform a lower rate scan (e.g., every 10 minutes).

Figure 4C:
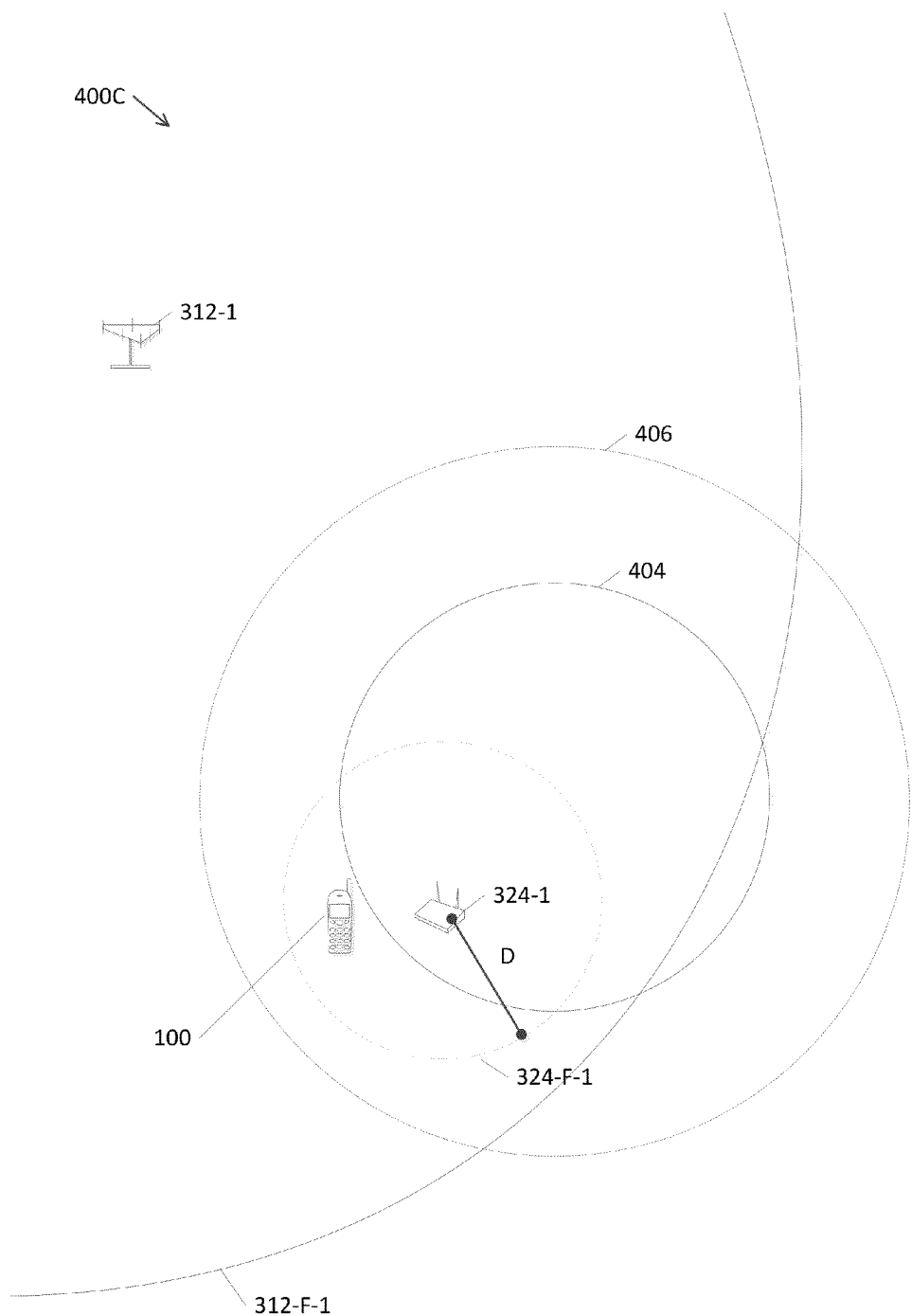
FIG. 4C is a spatial diagram of a mobile device that is located within the coverage of an AP.

Referring to FIG. 4C, with further reference to FIG. 4A, a spatial diagram 400C of a mobile device 100 that is located within the coverage of an AP 324-1 is shown. The mobile device 100, or another mobile device, is communicating with the serving cell 312-1 and is located within the maximum coverage area 406, which is associated with the AP 324-1 and was previously computed as described above in FIG. 4A. The mobile device 100 is configured to scan for the AP 324-1 at a high rate since the probability of detection is higher because it is located within the previously computed maximum coverage area 406. In this example, the mobile device 100 is within the range 'D' of the AP (i.e., the coverage area 324-F-1) and successfully scans for the AP 324-1. After a successful scan, the mobile device 100 can establish communication with the AP 324-1, and access the network 310 via the AP 324-1. The results of the successful scan can be sent by mobile device 100 to the location server 322 and stored on the scan history database 302 either immediately or a later time. For example, the location of the mobile device 100, and the time of the successful scan can be stored. The location server 322, or the mobile device 100, can determine a second maximum coverage area as described in FIG. 4A based on the successful scan and the current location of the mobile device 100. Additionally, in an embodiment, the mobile device periodically (e.g., every 30 secs, 1 min, 2 mins, 5 mins) provides or stores a location update including the current location of the mobile device 100 and the status of the connection to the AP 324-1 (e.g., signal strength, bits transferred, connection time). The mobile device 100 can be configured to either send a periodic location update, including for example, the connection status or store the location update in a local history log for mobile device 100 and send the stored history log to the location server 322 when later requested by location server 322 or periodically. Location updates or location history log updates may also be sent when the mobile device disconnects from the AP such as when the mobile device travels out of range, or terminates the connection to the AP 324-1. The location and status updates can be provided via communication with the serving cell 312-1 (i.e., via cellular link 132), or the AP 324-1 (i.e., via wireless link 123), or combinations of both.

Figure 4D:
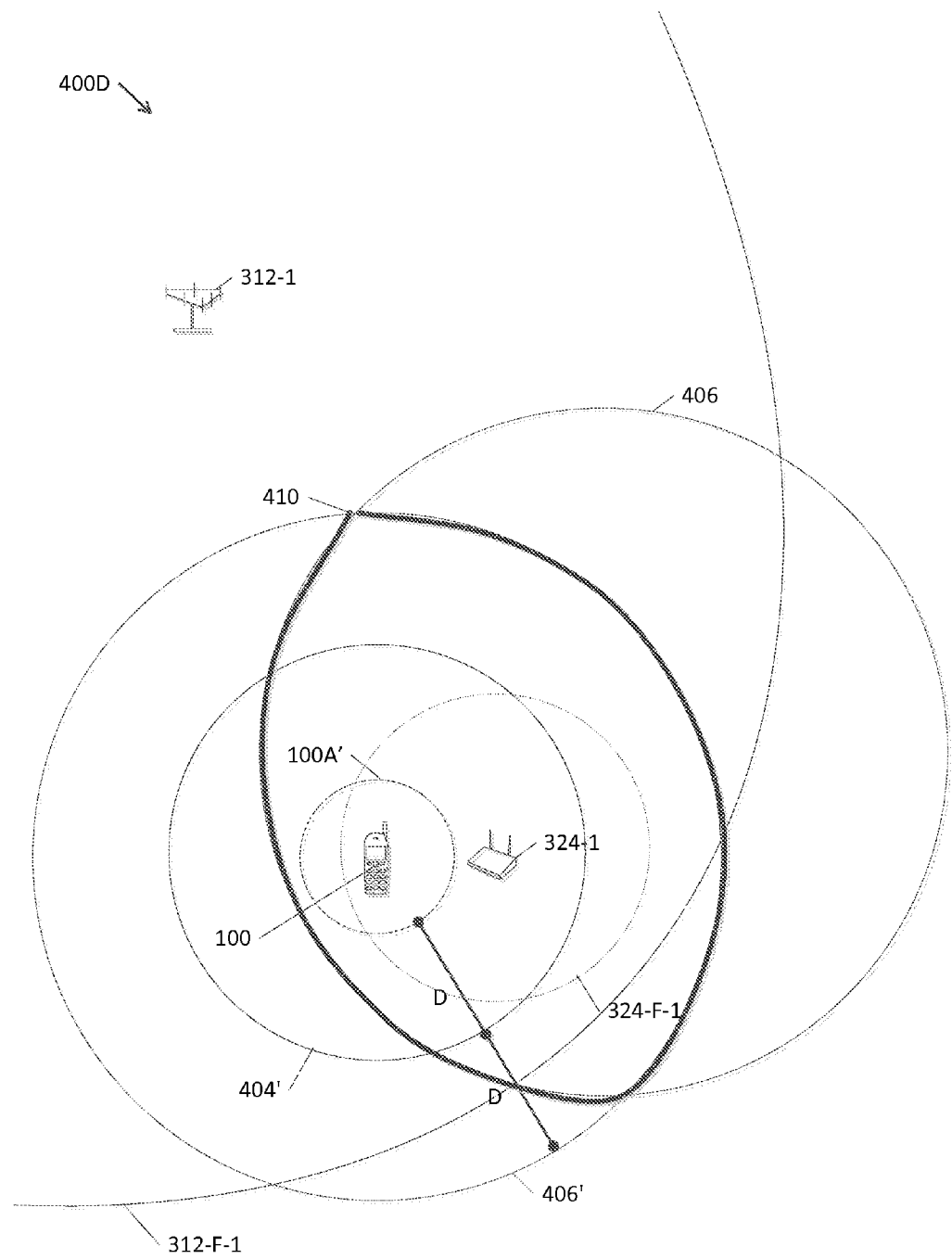
FIG. 4D is a spatial diagram of the intersection of two maximum coverage areas that are associated with an AP.

Referring to FIG. 4D, with further reference to FIGS. 4A and 4C, a spatial diagram 400D of the intersection of two maximum coverage areas that are associated with an AP is shown. As described in relation to FIG. 4C, the mobile device 100, or any other mobile device, is in communication with the serving cell 312-1 and is located within the maximum coverage area 406. After the mobile device 100 successfully scans for the AP 324-1, the location server 322 or the mobile device 100 can calculate a second maximum area of coverage 406' that is associated with the AP 324-1 and is determined in the same manner as the first maximum area of coverage 406 as described in relation to FIG. 4A. The second maximum coverage area 406' is calculated by determining an area of uncertainty 100A' around the mobile device 100, extending that area by a distance of D to determine a second location area 404', and then extending the second location area 404' by a distance of D, as shown in FIG. 4D. In an embodiment, the location server 322 or the mobile device 100 can be configured to determine the intersection between the two maximum coverage areas 406, 406'. The resulting area is the new maximum coverage area 410. The location server 322 can update the maximum coverage area information stored on the almanacs 344a, 344b. The new maximum coverage area 410 can be used to determine a scan rate when the mobile device 100, or another mobile device, is in communication with the serving cell 312-1 and is located within the new maximum coverage area 410. Refining the maximum coverage area that is associated with an AP can be a continuous process which can occur whenever a mobile device successfully scans for an AP or determines its location while in communication with an AP. The mobile device can be any mobile device with access to the location server. Thus, over time, multiple mobile devices and multiple scanning locations can be used to determine and refine a maximum coverage area for an AP.

In an embodiment, since calculating intersections of maximum coverage areas may be complex and/or processor intensive, a location server 322 or mobile device 100 may determine the coverage area for an AP using the locations (or most probable locations) for mobile devices such as mobile device 100 that have just accessed or are already in communication with the AP. The location server 322 or mobile device 100 may determine a minimum contiguous and regular area (e.g. a circle, ellipse or polygon) that encompasses all the locations. The minimum area may be treated as the coverage area for the AP and each time that a mobile device accesses the AP at a location outside of the current coverage area, a new minimum coverage area may be determined that encompasses the new location as well as the previous locations. To allow for the possibility that some mobile device locations may be in error, the location server 322 or mobile device 100 may instead assume some fixed coverage area compatible with the communication range of the AP (e.g. a circle with radius D) and determine a location for the fixed coverage area that encompasses a maximum number of mobile device locations associated with access to or communication with the AP. Alternatively, a fixed coverage area may be determined that encompasses a maximum weighted number of such locations where weighting factors may be proportional to the received AP signal strength and/or inversely proportional to the time duration since the location was obtained. The latter weighting, for example, may enable the fixed coverage area for an AP to move appropriately in the case that an AP is moved from one location to another.

The system 300 can be implemented using self-learning features. For example, the mobile device 100 and/or location server 322 can be configured to record the success/failure rate of AP searches associated with different conditions (e.g. different serving cells and/or locations at which an AP is or is not discovered). Conditions with a high success rate could then trigger an AP search at a high scan rate (e.g., every 1, 2, 3, 4 minutes), while conditions with a low success rate could trigger a lower scan rate search (e.g., every 8, 9, 10, 11, 12 minutes). As an example, assume an AP was detected by a mobile device in the past when the serving cell was any of A, B, C or D and that the location L of the mobile device is recorded as described above when the AP was accessed and possibly also recorded periodically while the mobile device is accessing the AP. The mobile device or location server 322 (i.e., the system 300), can maintain the probabilities P(A), P(B), P(C) and P(D) of the AP being detected when the serving cell is A, B, C or D, respectively, as running weighted averages. For example, if P(A) (in the range zero to one) is the current probability of accessing the AP when the serving cell is A and a mobile station is not able to access the AP when its serving cell is A, P(A) may be reduced to become X*P(A) where X is a fixed weighting factor greater than zero and less than one (e.g. X=0.95). If a mobile station is able to access the AP when its serving cell is A, P(A) may instead be increased to become (X*P(A)+(1−X)). The mobile device can also maintain the probability of AP detection for different locations or different location areas L and for different combinations of serving cell and location. At a later time, when the mobile device is communicating with a particular serving cell (e.g., serving cell Y), for example, and the mobile device is in a particular location (e.g., location M), the system 300 can calculate the probability that the AP will be detected based on the previously computed historic probabilities. For example, if the current cell Y is the cell A, then the probability that the mobile device will successfully access the AP will be given by the current value for P(A). These probabilities can be used to decide whether to perform a search immediately, or to wait and perform a search later and/or whether to perform a search at a high scan rate or a low scan rate. This provides the capability of a more dynamic selection of the high and low search rate criteria. In an embodiment, the probabilities, or the data used in calculating the probabilities (e.g., the scan history db 302), can be crowd sourced by many mobile devices to one or more servers (e.g. the location server 322) in one or more networks to allow for improved probabilities to be calculated and downloaded to other mobile devices.

Figure 5:
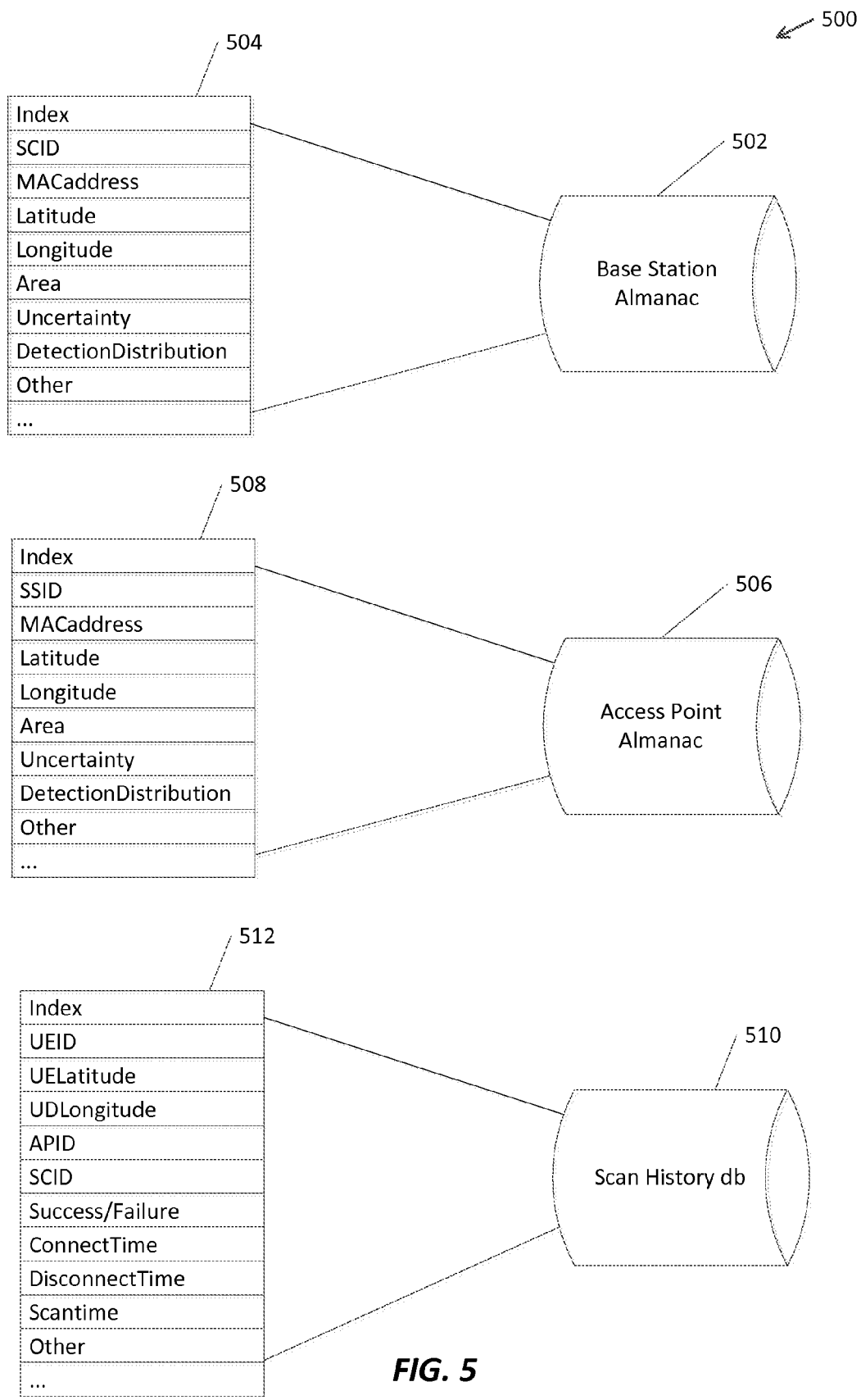
FIG. 5 includes exemplary data structures for base station and scan history information.

In an example, the system 300 can store a running weighted average for a serving cell and location combination. For example, the system 300 maintains an overall probability score for a combination of a serving cell C and location L (and may maintain the overall probability score for other combinations of serving cell and location). The location L may be restricted to one of a number of small fixed location areas (e.g. rectangles, squares of hexagons) that are non-overlapping and collectively encompass some area of interest such as a city or the coverage area of a WAN. As an example, each location L may correspond to a 200 by 200 meter square location area defined using a square grid. Every time a search is performed when a mobile device has a serving cell that is C and is at, within or at some maximum distance from the location L, a weighted average is adjusted by a small amount. For example, if the initial weighted average for a location is 10% and a mobile device performs a successful search with serving cell C at or near the location L, the average can be increased to 11%. If the search is not successful, the average can be lowered. More generally, an average A may be increased to (x*A+(1-x)) for a successful search and reduced to (x*A) for an unsuccessful search where x is a fixed weighting factor greater than zero and less then one (e.g. x=0.95). In this way, if there are a large number of consecutive failures, the weighted average can go down. The opposite is true for a large number of consecutive successes. By making the adjustments very small and based on an assumption that in general the results are going to be statistically independent, the system can produce an accurate model. The weighted average model has the benefits of being a simple calculation and requiring less storage Referring to FIG. 5, with further reference to FIG. 3, an exemplary data structure 500 for location information is shown. The data structure 500 is exemplary only and not a limitation as additional tables and fields may be used. The data structure 500 can persist in a location server 322, or other storage devices on the network, and can include one or more databases such as a base station almanac 502, an access point almanac 506, and a scan history database 510. The almanacs 502, 506 and the scan history database 510 can be one or more relational databases with a collection of tables. Some or all of the data within the almanacs 502, 506 and the scan history database 510 may also be stored on the mobile device 100. The databases 502, 506, 510 can include one or more tables 504, 508, 512 containing data fields for location information. The data fields can be of data types as known in the art (e.g., number, char, varchar, date, etc. . . . ). The location information can include multiple fields to represent a serving cell or AP, such as a base station or serving cell ID, a SSID, a MAC address of an AP, the latitude and longitude of the station, the coverage area (e.g., footprint) of a station, an uncertainty value, and a detection distribution for the coverage area. Information describing the maximum coverage area 406 of an AP may also be stored in the almanac. The tables 512 in the scan history database 510 can include information relating to individual scan events. For example, the location server 322 can execute an update query to create a new record whenever a mobile device attempts to scan for an AP or later reports the results for such a scan. A scan history record can include a unique index and data fields for information relating to the scan event. As an example, and not a limitation, fields such as the ID of the mobile device (e.g., User Equipment), the position of the mobile device, an ID for the current serving cell, the results of the scan (e.g. success or failure), the maximum coverage area of the AP, the time of day for the scan, the time of the connection (if any), the disconnect time, the time (i.e., duration) of the scan, and the rate and number of scan attempts. Other fields relating to scan and communications with either the serving cell or AP (e.g., operating and signal parameters) may also be used and stored on scan history database.

Figure 6:
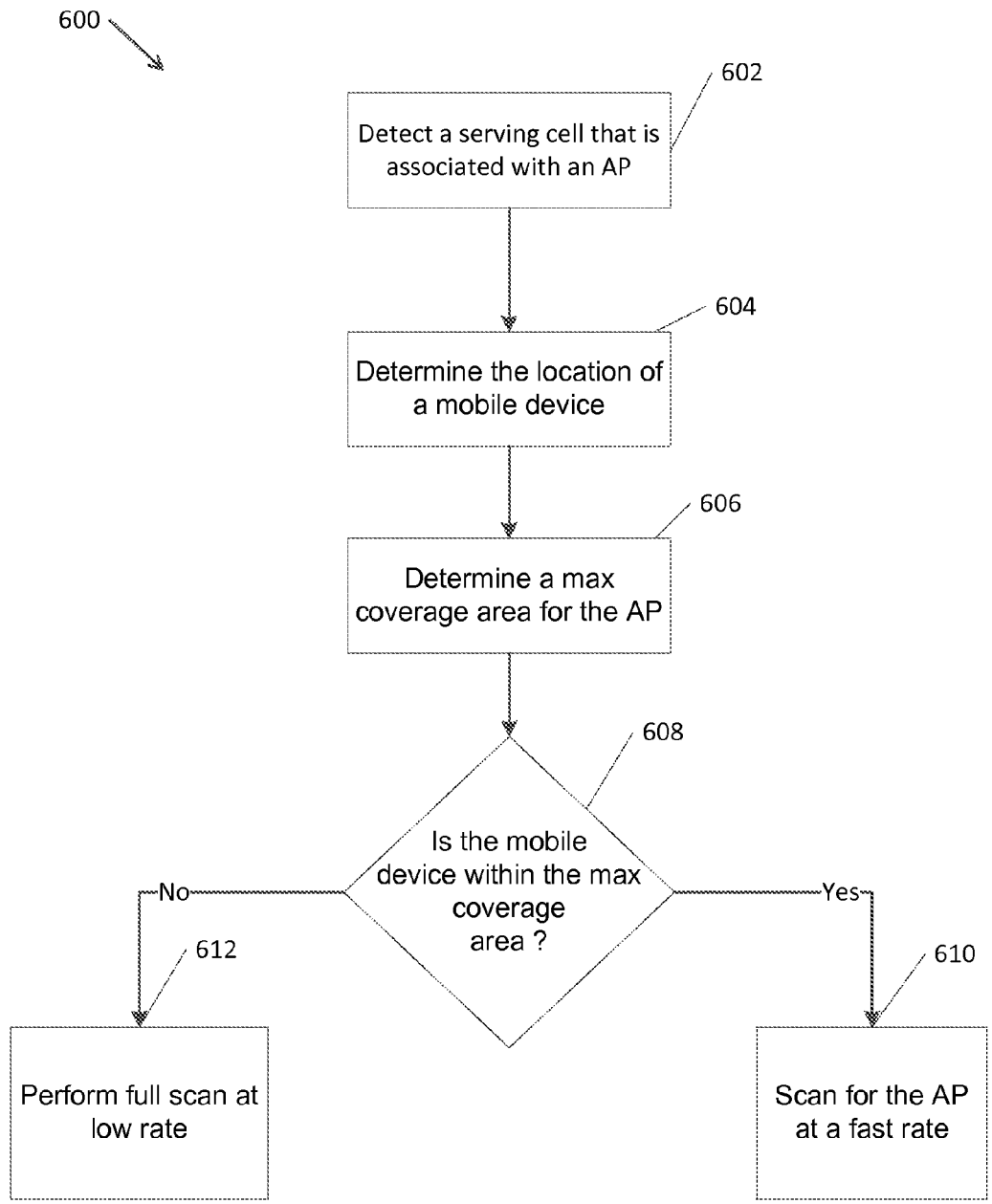
FIG. 6 is a flow diagram of an embodiment of a process for utilizing the expected coverage area of an AP to select a scan rate.

In operation, referring to FIG. 6, with further reference to FIGS. 3 and 4A-4D, a process 600 for utilizing the expected coverage area of an AP to select a scan rate using the system 300 includes the stages shown. The process 600, however, is exemplary only and not limiting. The process 600 may be altered, e.g., by having stages added, removed, or rearranged.

At stage 602, the mobile device 100 can detect a serving cell 312-1. In an embodiment, the serving cell is associated with an AP 324-1. For example, the association between the serving cell 312-1 and the AP 324-1 can be a correlation table within the location server 322 which provides a relationship between indexes in the tables 504, 508 in the almanacs. The correlation table can be based on location information and the expected or actual coverage areas of the serving cell and the AP. In an embodiment, the association between the serving cell 312-1 and the AP 324-1 can be based on records within the scan history database 302 such as when any mobile device performs a successful scan for the AP 324-1 while communicating with the serving cell 312-1, or while within the coverage area 312-F-1 of the serving cell, and a record is created or updated in the scan history database 302. The mobile device 100 can send and receive information from a serving cell 312-1 via a wireless network (e.g., wireless link 132). The serving cell 312-1 is operably connected to a location server 322, and can send and receive almanac information to the mobile device. In an example, the mobile device 100 can detect a Serving Cell ID (SCID) that is transmitted, or broadcast, by the serving cell 312-1.

At stage 604, the location of the mobile device 100 can be determined. In an example, the mobile device 100 includes an SPS receiver 155 and is configured to determine a position based on satellite signals 159. In an embodiment, the mobile device 100 can utilize the serving cell 312-1 and other network resources, including other APs, to determine a location (e.g., trilateration). The location of the mobile device can be determined locally (i.e., utilizing the processor 111), or remotely (e.g., on the location server 322). Other positioning techniques as known in the art may be used.

At stage 606, the mobile device 100 or the location server 322 can determine the maximum coverage area for an AP that is associated with the serving cell 312-1. In an example, data representing the ID of the serving cell can be used as a predicate and/or expression in a database search query. The results of such a query can include a list of one or more AP stations and their respective maximum coverage areas. Referring to FIG. 4B as an example, the AP station 324-1 is associated with the serving cell 312-1. The mobile device 100 can detect the SCID from the serving cell 312-1, and can then determine the size and location of the maximum coverage area for one or more APs, such as the area 406. The data representing the maximum coverage area 406 can be previously stored on the mobile device 100, or can be retrieved from the location server 322. At stage 608, the mobile device 100 compares its current position to the maximum coverage area 406. Standard geographic positioning algorithms as known in the art may be used to determine whether or not the mobile device 100 is within the maximum coverage area 406 or may be within the coverage area 406 (e.g. due to inclusion of some or all of an uncertainty area for mobile device 100 within the maximum coverage area 406). If the mobile device 100 is (or may be) within the maximum coverage area 406, then the mobile device executes a scan for an AP station at a higher rate (e.g., every 1, 2, 3, 4 minutes) at stage 610. If the results of the comparison indicated that the location of the mobile device is outside of the maximum coverage area 406, then at stage 612 the mobile device 100 can delay scanning, or scan at a lower rate (e.g., every 8, 9, 10, 11, 12 minutes). The reduced scan rate can help prolong the battery life of the mobile device and/or reduce interference to services currently being provided to the user of mobile device 100.

Figure 7:
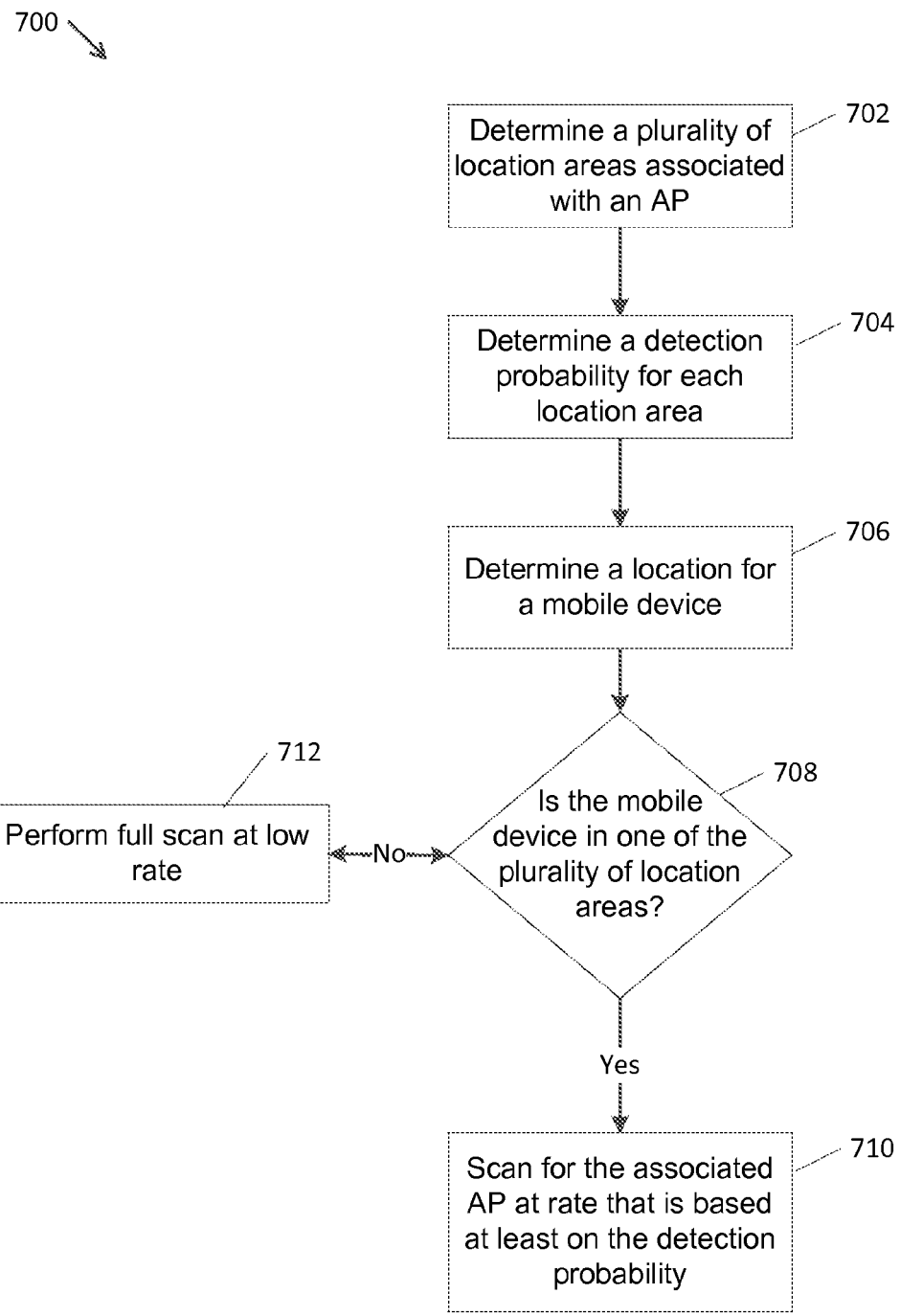
FIG. 7 is a flow diagram of an embodiment of a process for AP scanning based on the coverage area of a serving cell and the location of the mobile device.
Figure 9:
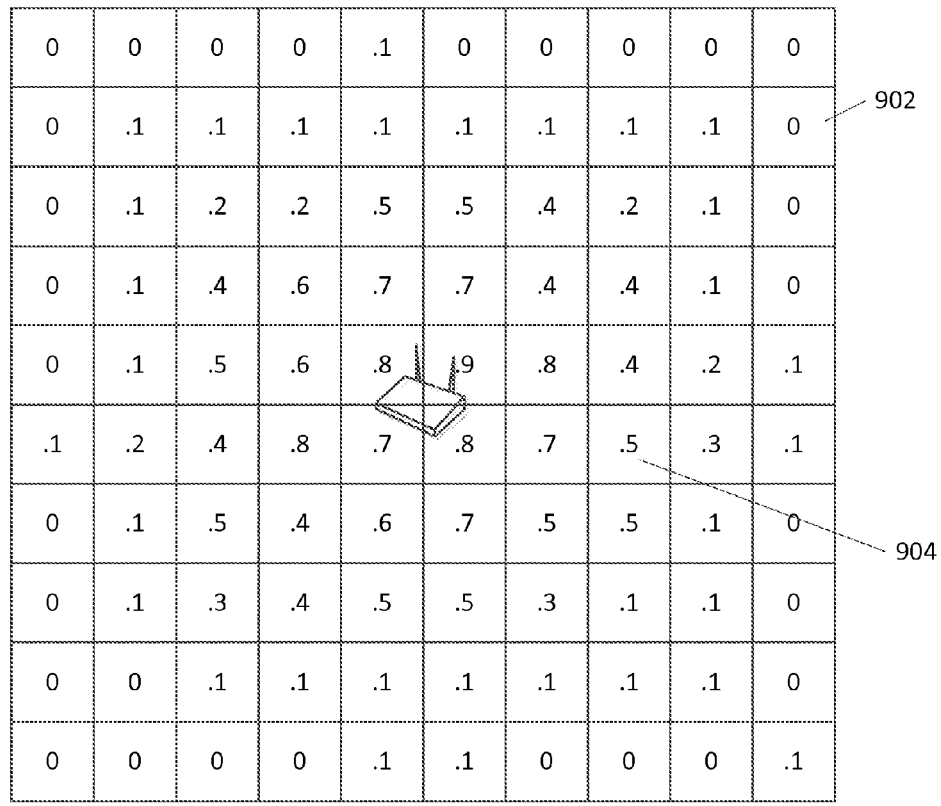
FIG. 9 is an exemplary geographic grid with each cell indicating a probability of detecting an AP.

In operation, referring to FIG. 7, with reference to FIG. 9, a process 700 for AP scanning based on the coverage area of a serving cell and the location of the mobile device using the system 300 includes the stages shown. The process 700, however, is exemplary only and not limiting. The process 700 may be altered, e.g., by having stages added, removed, or rearranged.

At stage 702, the location server 322 can associate one or more location areas with an AP. In an embodiment, a serving cell 312-1 may have a large coverage area 312-F-1 (e.g. tens or even hundreds of square kilometers in a rural or suburban environment) whereas an AP 324-1 may have a very small coverage area 324-F-1 (e.g. 5000 square meters or less). In such a scenario, obtaining and making use of the probability of successfully acquiring a particular AP in association with any serving cell may be limited. For example, if the serving cell coverage area 312-F-1 is 10 square kms and the AP coverage area 324-F-1 is 5000 square meters, the probability of successful acquisition may be only around 1/2000 whenever a mobile device is within the serving cell coverage area 312-F-1. This may be too small to justify a high rate of scan for the AP. To circumvent this problem, a mobile terminal may record its current location as accurately as possible each time a scan is performed for a particular AP. The scan result may also be recorded in association with the location—either as a success or a failure. At stage 702, these scan results may then be aggregated over a period of time—either in a particular mobile device or in a location server 322 that obtains the scan results from many devices and then provides data obtained from the aggregated results to individual devices to assist with future scanning decisions. For example, the location server 322 can collect, store and disseminate the aggregated results.

At stage 704, the location server 322 can determine a detection probability for the previously recorded locations. The aggregated scan results in the scan history database can be used to more accurately predict the probability of acquiring an AP at a future time and at any given location.

In an embodiment, the scan results may be simplified by expressing them relative to a particular geographic area together with a function (e.g. a normal distribution) that defines how the probability of acquiring the AP varies at different locations across this area. This simplification may greatly reduce the amount of data that needs to be stored or transferred (e.g. from a server to a mobile device) to support a rate of scan selection for acquiring a signal from the AP. In an example, the geographic area within which successful AP acquisition has occurred may be overlaid with a grid of cells (e.g. a rectangular grid whose cells are approximately 100 by 100 meter squares). The mobile device or server may count the number of times successful acquisition of the AP occurred for locations within each grid cell versus the total number of acquisition attempts from within the grid cell and thereby obtain the fraction of attempts that were successful. In a further simplification, the fraction of successful attempts may be maintained as a running weighted average F, where F is increased to (y*F+(1−y)) for each new successful acquisition and is reduced to (y*F) for each new unsuccessful acquisition for some fixed weighting factor y greater than zero and less than one (e.g. y=0.95). As an example only, and not a limitation, the grid 900 in FIG. 9 represents a collection of square shaped locations 902 located around an AP. The boundaries of each of the grid squares can be defined by latitude and longitude coordinates, Cartesian, polar, or other coordinates based on a known origin. In an example, the origin of the grid 900 corresponds to the location of an AP station. Each of the location areas (e.g., 902, 904) includes a probability value between 0 and 1. This fraction may be treated as the probability of successful acquisition of the AP for some future acquisition attempt at a location 902 anywhere within the particular grid cell 900.

At stage 706, the location of the mobile device is determined Satellite systems such as GPS, or terrestrial based positioning techniques as previously discussed may be used. At stage 708, the location server 322, or the mobile device 100, determines if the mobile device 100 is located in one of the location areas. For example, the mobile device can be in or near any of the location areas as defined by the grid 900. If the location of the mobile device is outside any of the location areas (e.g., outside of the grid 900), then at stage 712 the mobile device 100 is configured to delay scanning, or perform a default scan to help preserve battery life. In an example, the default scan is a full scan at a low rate (e.g., every 10 mins). If the mobile device 100 is located within one of the location areas (e.g. within the grid 900), then a scan is initiated at a rate based on a probability associated with the location area the mobile device 100 is in. For example, if the mobile device 100 is located in an area 902 which is close to the edge of the grid 900, the probability of detecting the AP may be zero. In this case, the mobile device 100 may be configured to delay or perform a default scan (i.e., low rate) to help conserve power. Alternatively, if the mobile device 100 is located in an area that is closer to the AP, the probability of detecting the AP may be higher (e.g. may be 10% or more) and the scan rate of the AP can increase because the probability of detecting the AP is increased. For example, if the mobile device 100 is located in the area 904, then there is a 50% probability of detecting the AP. In an embodiment, a probability of 50% or greater may be sufficient to trigger a high rate scan (e.g., every 3 mins or less). In operation, the probability thresholds and corresponding scan rates can vary based on implementation factors such as wireless technology of the AP, mobile device design, surrounding geography and other factors that may impact wireless signal attenuation. The probability values in each of the location areas can be continuously updated such that subsequent successful or unsuccessful scans can raise or lower the probability value.

Figure 8:
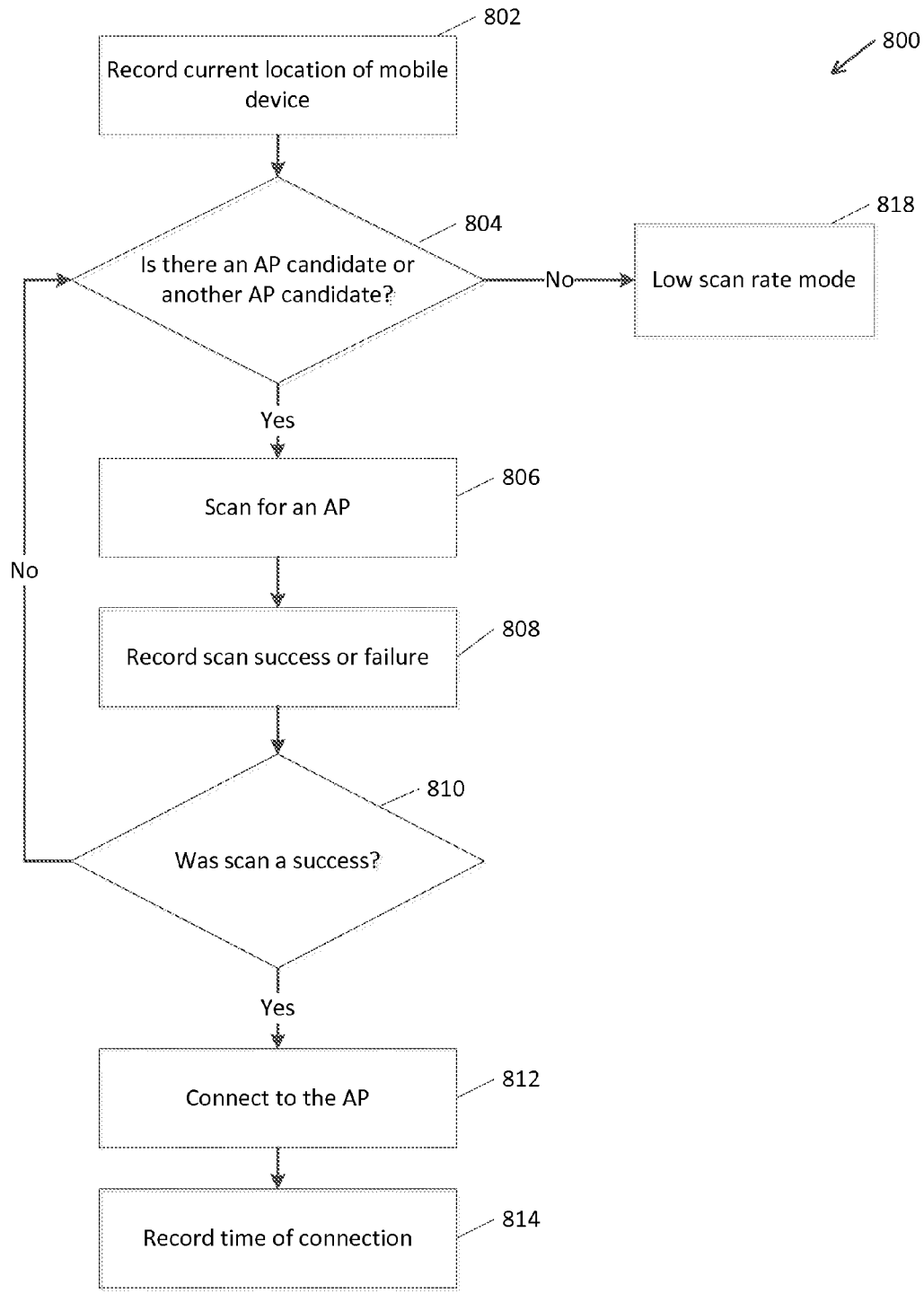
FIG. 8 is a flow diagram of an embodiment of a process for access point acquisition using location and probabilistic self-learning.

In operation, referring to FIG. 8, with reference to FIG. 9, a process 800 for access point acquisition using location and probabilistic self-learning with the system 300 includes the stages shown. The process 800, however, is exemplary only and not limiting. The process 800 may be altered, e.g., by having stages added, removed, or rearranged.

At stage 802, the mobile device 100 or the location server 322, can be configured to record the current location of the mobile device 100 and possibly the current serving cell. Stage 802 may be performed periodically at some low rate (e.g. every 15 minutes) and/or may be performed whenever the mobile device is at some new location and/or may be performed whenever the mobile device 100 needs to obtain its location for other reasons—e.g. to assist or perform some service for the user of mobile device 100 or an application running on mobile device 100 or to provide a location (e.g. via network 230 or 310) to some external client. As previously described, satellite systems such as GPS, and/or terrestrial based positioning techniques and/or inertial sensors as known in the art may be used to determine the location of the mobile device. Recording the location information can include storing the data locally (i.e., on the mobile device), or remotely (e.g., on the scan history database 302 via the location server 322). At stage 804, the mobile device 100 may use the determined location and possibly the serving cell ID to determine whether to perform an immediate scan for a particular AP. In an embodiment, the mobile device 100 includes a scanning algorithm configured to execute the stages of process 600 described in FIGS. 4A-4D, 6 and may equate a fast scan rate for a particular AP as synonymous with performing an immediate scan for the AP. In an embodiment, the mobile device 100 includes a scanning algorithm configured to execute the stages of process 700 described in FIGS. 7, 9 and may equate a fast scan rate for a particular AP as synonymous with performing an immediate scan for the AP. Other scanning algorithms may also be used. At stage 806, the mobile device 100 scans for the AP chosen at stage 804. At stage 808, the mobile device 100 can store the results of the scan. The success or failure indication can be stored locally, or remotely. In an embodiment, the scan history database 302 includes a data structure 512 configured to store scan related success or failure information. In an example, the success or failure information can be stored locally and uploaded to a location server 322 at a later time. Similarly, data within the location server 322 can be downloaded to the mobile device 100 as required, such as when the mobile device 100 enters a new serving cell or other defined geographic area.

At stage 810, the mobile device 100 determines if the scan is a success. In general, a successful scan means that the mobile device 100 establishes a communication link with the AP that is sufficient to establish a connection at stage 812. The term connect at stage 812 is used broadly to mean the ability to transfer data between the mobile device 100 and an AP. As an example, referring to FIG. 2, the mobile device 100 can establish a wireless link 123 with the AP 210 to communicate via the network 230 with the location server 250. Once a connection to the AP is established, the time of the connection can be recorded at stage 814. In an example, the time of day of the connection can be stored on the mobile device 100, or sent to the location server 322 (e.g., via the AP or the serving cell). In an embodiment the calculations to determine the AP acquisition probabilities can be further refined based on the time of day data (e.g. separate acquisition probabilities may be determined for normal working hours versus non-normal working hours or for daytime versus night time). Other scan and location related information such as a disconnect time, amount of data transferred, relevant signal related parameters, and other visible station IDs may be sent.

If the scan was determined at stage 810 not to be successful, the mobile device 100 may return to stage 804 to determine if another AP candidate is available for scanning. The location server 322 can provide a list of candidates to the mobile device 100 based on the proximate location of one or more APs. In an example, the order in which the APs on the list are scanned by mobile device 100 can be based on the probability of detection (e.g., higher probabilities first), or on the proximate location of an AP (e.g., closest stations first). Other criteria may also be used. For example, a mobile device 100 may have a preference for certain APs based on better service from these APs and/or on lower or zero billing charges. This preference may be established in part via user input—e.g. with a user indicating a particular preference—and/or may be inferred from the length of time the mobile device remains connected to an AP on previous occasions (e.g. with a longer connection time being associated with a higher preference) and/or may be determined from information provisioned on mobile device 100 by the user or home operator of mobile device 100. The preference may be stored on mobile device 100 and/or transferred to a location server (e.g. location server 322) and may be stored in scan history database 302 and/or access point almanac 344b. In an embodiment, a higher preference for a certain AP A1 with a lower probability of successful acquisition may sometimes take precedence over another AP A2 with a higher probability of successful acquisition and may cause AP A1 to be scanned before AP A2. In a further embodiment, a mobile device 100 may scan for multiple APs at the same time in which case stage 804 may be performed only twice (e.g. once to determine a set of APs to be scanned simultaneously at stage 806 and a second time to verify there are no more APs to scan for). Assuming stage 804 is repeated and if another AP candidate is available, the process can repeat the scan attempt at stage 806 as before. If another candidate AP is not available, at stage 818 the mobile device 100 can be configured to delay scanning or execute a scan at a low rate in an effort to conserve power. Stage 818 may be continued until the mobile device has moved to some new location (e.g. is known to have travelled some minimum distance such as 200 meters from its previous location or has possibly travelled some minimum distance due to the elapse of some minimum time period such as 15 minutes) after which process 800 may resume again at stage 802.

In an embodiment, the scan rate used by the mobile device 100 to search for a particular AP may be based on previous acquisition results of a near-by location. For example, in the case of acquisition results aggregated according to the example of FIG. 9, probabilities within the location area grid 900 may not be obtainable or may not be statistically meaningful if the number of acquisition attempts for each grid cell is zero or very low, respectively. To remedy this, it may be assumed that when a terminal is at some location L, the probability of successfully acquiring an AP increases or decreases when there are nearby locations at which a particular acquisition attempt was successful or unsuccessful, respectively, in the past. In this case, the terminal may obtain a weighted average of the acquisition success rate in the past as follows:

Weighted success rate=$(\Sigma 1/(A+\text{distance } L \text{ to } Li)^{}p)/(\Sigma 1/(A+\text{distance } L \text{ to } Lk)^{}p)$ where:
L refers to a current location for a terminal;
Li refers to the location of a successful acquisition attempt i;
Lk refers to the location of any acquisition attempt k whether successful or unsuccessful;
the summation in the numerator term is over all successful acquisitions i;
the summation in the denominator term is over all acquisitions k (successful and unsuccessful);
A and p are fixed parameters (e.g. A=5 meters, p=0.5);
** denotes exponentiation.

The weighted success rate can then be treated as the probability that a future acquisition attempt at location L will be successful. In cases where there was a successful or unsuccessful acquisition at the location L (i.e. where the distance L to Li or L to Lk above is either zero or too small to measure), introduction of the coefficient A avoids infinite values in the summation. Use of a weighted success rate may enable determination of whether to attempt immediate acquisition of a particular AP versus deferring such an attempt or whether to perform a fast rate scan versus a slow rate scan for the AP when there is only a small amount of scan history data (e.g. in database 510 in FIG. 5) due to only a small number of known or reported acquisition attempts for the AP nearby to the location L.

The method described herein to enable efficient acquisition of a preferred AP by a mobile device 100 may rely on mobile device 100 having reliable and accurate knowledge of its current location. It may thus be beneficial to ensure that any saving in resources to efficiently acquire a preferred AP is not obtained at the cost of using more resources to maintain knowledge of mobile device 100's current location. To enable this, mobile device 100 may employ existing standard GNSS and/or terrestrial position methods such as Assisted GNSS (A-GNSS), Observed Time Difference Of Arrival (OTDOA) and Advanced Forward Link Trilateration (AFLT) only intermittently—e.g. periodically (e.g. every 15 or 30 minutes) and/or after mobile device 100 has moved some significant distance (e.g. 200 meters) from some previous known position. In between such standard GNSS/terrestrial based positioning, mobile device 100 may make use of internal inertial sensors to detect whether it is stationary (or nearly stationary) or moving and, in the latter case, may use its inertial sensors to determine its change in location from some previously known location. Use of inertial sensors (e.g. if implemented primarily using hardware rather than software) may impose little demand for resources from mobile device 100 such as processing and battery. Mobile device 100 may also make use of APs (e.g. WiFi APs or Femtocells) that are detected when scanning for these or other APs to update its location. For example, if some APs have known locations (e.g. locations known to location server 322 and present in base station almanac 344a and/or Access Point almanac 344b), mobile device 100 or location server 322 may obtain a location estimate for mobile device 100 based on these known locations and possibly on measurements made by mobile device 100 of signals transmitted by these APs (e.g. such as signal propagation time or signal strength). In this way, mobile device 100 may maintain its location without excessive use of resources (e.g. battery) enabling mobile device 100 to make use of its known location to determine when and how often to scan for APs of interest as described above herein—e.g. in association with FIGS. 6, 7 and 8.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Location determination and estimation techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband CDMA (WCDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. An AP can be an access point to a WLAN and may be an IEEE 802.11x network, a WPAN and may be a Bluetooth network, an IEEE 802.15x, or some other type of network. The techniques may also be implemented in conjunction with any combination of WWAN, WLAN and/or WPAN.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of scanning for an access point with a mobile device, comprising:
   detecting a current serving cell currently serving the mobile device;
   determining a current location for the mobile device;
       determining whether the mobile device is currently within a maximum coverage area of the access point based on the current serving cell, the current location of the mobile device, and a scan history corresponding to one or more attempts to detect the access point associated with the current serving cell and the current location of the mobile device;
       scanning for the access point at a first frequency if it is determined that the mobile device is within the maximum coverage area of the access point; and
       scanning for the access point at a second frequency if it is determined that the mobile device is outside of the maximum coverage area of the access point, wherein the first frequency is higher than then the second frequency.

2. The method of claim 1 wherein the maximum coverage area of the access point is an area of a circle with a radius of twice a typical coverage range of the access point plus a radius of an uncertainty area, wherein the typical coverage range of the access point may be based on factors including at least one of transmission power, type of radio technology, and antenna configuration.

3. The method of claim 1 wherein the scan history comprises data records including a plurality of locations corresponding to one or more attempts by a respective plurality of mobile devices to detect the access point associated with the current serving cell.

4. The method of claim 1 further comprising:
   establishing a connection between the mobile device and the access point; and
   storing a successful scan result, wherein the successful scan result includes an indication that a scan was successful and the current location of the mobile device.

5. The method of claim 4 comprising storing a periodic location update, wherein the periodic location update includes connection status information and an updated location of the mobile device.

6. The method of claim 4 comprising storing a disconnect update when the mobile device disconnects from the access point, wherein the disconnect update includes the current location of the mobile device at the time of the disconnection.

7. An apparatus, comprising:
   a memory;
   at least one processor coupled to the memory and configured to:
       identify a current serving cell currently serving a mobile device;
       determine a current location of a mobile device;
       determine whether the mobile device is currently within a maximum coverage area of an access point based on the current serving cell, the current location of the mobile device, and a scan history corresponding to one or more attempts to detect the access point associated with the current serving cell and the current location of the mobile device;
       scan for the access point at a first frequency if it is determined that the mobile device is within the maximum coverage area of the access point; and
       scanning for the access point at a second frequency if it is determined that the mobile device is outside of the maximum coverage area of the access point, wherein the first frequency is higher than the second frequency.

8. The apparatus of claim 7 wherein the at least one processor is configured to determine the maximum coverage area of the access point as an area of a circle with a radius of twice a typical coverage range of the access point plus a radius of an uncertainty area, wherein the typical coverage range of the access point may be based on factors including at least one of transmission power, type of radio technology, and antenna configuration.

9. The apparatus of claim 7 wherein the at least one processor is configured to:
   establish a connection with the access point; and
   store in the memory an indication that the scan was successful and the current location of the mobile device.

10. The apparatus of claim 7 wherein the at least one processor is configured to:
    determine that a connection with the access point cannot be established; and
    store in the memory an indication that the scan was unsuccessful and the location of the mobile device.

11. An apparatus for scanning for an access point, comprising:
    means for detecting a current serving cell currently serving a mobile device;
    means for determining a current location for the mobile device;
    means for determining whether the mobile device is currently within a maximum coverage area of the access point based on the current serving cell, the current location of the mobile device, and a scan history corresponding to one or more attempts to detect the access point associated with the current serving cell and the current location of the mobile device;
    means for scanning for the access point at a first frequency if it is determined that the mobile device is within the maximum coverage area of the access point; and
    means for scanning for the access point at a second frequency if it is determined that the mobile device is outside of the maximum coverage area of the access point, wherein the first frequency is higher than the second frequency.

12. The apparatus of claim 11 wherein the maximum coverage area of the access point is an area of a circle with a radius of twice a typical coverage range of the access point plus a radius of an uncertainty area, wherein the typical coverage range of the access point may be based on factors including at least one of transmission power, type of radio technology, and antenna configuration.

13. The apparatus of claim 11 wherein the scan history comprises data records including a plurality of locations corresponding to one or more attempts by a respective plurality of mobile devices to detect the access point associated with the current serving cell.

14. The apparatus of claim 11 further comprising:
 means for establishing a connection between the mobile device and the access point; and
 means for storing a successful scan result, wherein the successful scan result includes an indication that a scan was successful and the current location of the mobile device.

15. The apparatus of claim 14 comprising means for storing a periodic location update, wherein the periodic location update includes a connection status information and an updated current location of the mobile device.

16. The apparatus of claim 14 comprising means for storing a disconnect update when the mobile device disconnects from the access point, wherein the disconnect update includes the current location of the mobile device at a time of the disconnection.

17. A non-transitory computer program product residing on a processor-executable computer storage medium, the computer program product comprising processor-executable instructions configured to cause a processor to:
 detect a current serving cell currently serving a mobile device;
 determine a current location for the mobile device;
 determine whether the mobile device is currently within a maximum coverage area of an access point based on the current serving cell, the current location of the mobile device, and a scan history corresponding to one or more attempts to detect the access point associated with the current serving cell and the current location of the mobile device;
 scan for the access point at a first frequency if it is determined that the mobile device is within the maximum coverage area of the access point; and
 scan for the access point at a second frequency if it is determined that the mobile device is outside of the maximum coverage area of the access point, wherein the first frequency is higher than the second frequency.

18. The non-transitory computer program product of claim 17 wherein the scan history comprises data records including a plurality of locations corresponding to one or more attempts by a respective plurality of mobile devices to detect the access point associated with the current serving cell.

* * * * *